June 7, 1955     H. L. PENBERTHY     2,710,306
MANUFACTURE OF GLASS
Filed Sept. 3, 1954
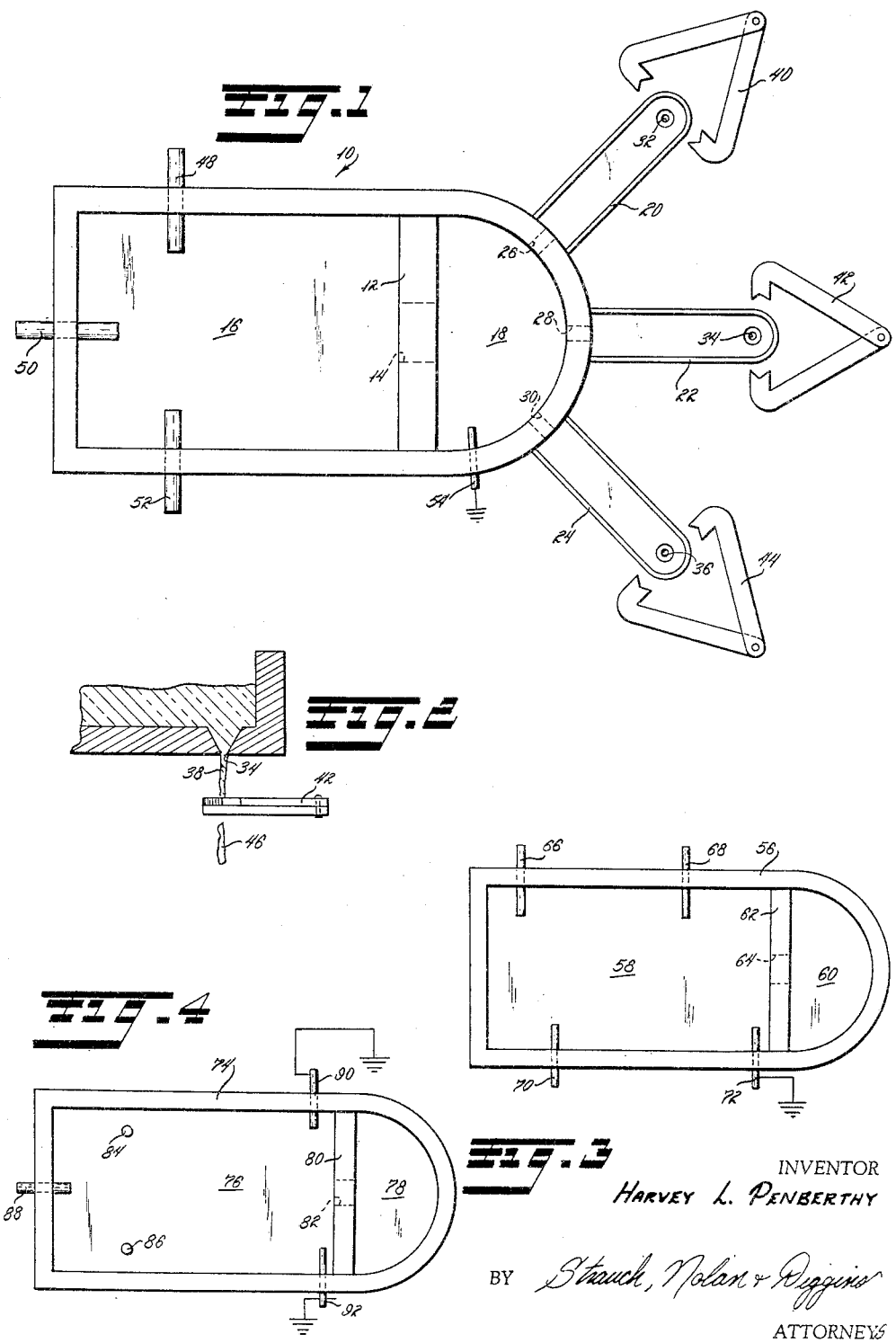
INVENTOR
HARVEY L. PENBERTHY
BY *Strauch, Nolan & Diggins*
ATTORNEYS United States Patent Office 2,710,306
Patented June 7, 1955

2,710,306

MANUFACTURE OF GLASS

Harvey L. Penberthy, Seattle, Wash.

Application September 3, 1954, Serial No. 454,178

11 Claims. (Cl. 13—6)

In the manufacture of glass electrical Joule effect heat has been utilized either in conjunction with combustion produced heat or in place of such heat. In the conventional furnace having a combined melting and fining zone the batch of raw glass is introduced into the melting zone, is melted, fined, and then flows through a submerged throat in the bridge wall into the working zone. From the working zone the molten glass is discharged from submerged apertures in the working zone or in conventional draw-off troughs. The stream of glass flowing from such draw-off aperture is then divided into glass masses of the desired size by means of shears which are mounted beneath the apertures and act in the manner of conventional shears or scissors to cut the filament of glass.

Where such Joule effect electrical heating is utilized in glass furnaces these shears tend to corrode and disintegrate and are rapidly destroyed, making replacement a time consuming and expensive problem. A similar situation is encountered with the tanks utilized to produce rolled glass. Here the tanks are equipped with rollers which are rapidly destroyed by arcing caused by Joule effect currents. A further disadvantage of such heating lies in the fact that the readings of alternating current amplified thermocouples tend to be erratic and are not always reliable.

It is accordingly a primary object of the present invention to provide glass furnaces in which Joule effect heating may be utilized without shortening the life of the shears and without interfering with the accuracy of the reading of alternating current amplified thermocouples.

It is another primary object of this invention to provide a method of manufacturing glass wherein Joule effect heating is utilized either as the sole source of heat or as an auxiliary source of heat and wherein excessive deterioration of the shears and inaccuracy in the thermocoupling readings is prevented.

It is a still further object of this invention to provide a means and method for manufacturing glass through the use of Joule effect heating wherein Joule effect currents are prevented from flowing out of the glass outlet to the shears.

It is a still further object of this invention to provide a means and method for manufacturing glass through the use of Joule effect heating wherein a grounded electrode is utilized to prevent stray currents from interfering with thermocouple readings or from flowing to the shears.

Further objects and advantages of the invention will become apparent upon reference to the following specification claims and drawings wherein:

Figure 1 shows a plan view of a glass tank utilizing Joule effect heating.

Figure 2 is a cross-sectional view of the draw-off trough showing the filament of glass being cut by the shears;

Figure 3 is a plan view of another glass furnace utilizing Joule effect heating and Figure 4 is a plan view of still a further glass furnace utilizing Joule effect heating.

In the operation of a conventional glass furnace the batch charger mechanism intermittently contacts the batch charge and is more or less always covered with a coating of soda ash dust. I have now found that this contact of the batch charger mechanism with the batch and this coating of soda ash dust and contact of the batch charger mechanism with such soda ash dust produces a partial ground at the charging end of the tank. This partial ground is closest to one electrode in the Joule effect electrode system, usually an electrode located in the back wall of the furnace, and this causes the remaining portions of the glass in the tank to be at a substantial potential with respect to anything which is at ground potential.

Since the shears are normally and as a practical matter grounded, a stray current is caused to flow from one or more electrodes through the throat in the bridge wall into the working zone and thence through the glass outlet apertures to the shears, destroying the shears by arcing during each time the shears make and break contact with the glass. In addition it has been found that these stray currents in the working zone interfere with the accuracy of the readings of any alternating current amplified thermocouples.

According to my invention these currents are eliminated by providing one or more grounded electrodes either in the working zone, or in the fining zone in such a position as to prevent the flow of such currents through the throat of the bridge wall. This causes the stray currents resulting from partial grounding of the charging end of the tank to flow from the electrode nearest the working zone to the ground electrode rather than through the outlet apertures to the shears, and enables a channeling of the currents in such a manner as to permit accurate thermocouple readings.

Referring more particularly to Figure 1 there is shown a glass tank 10 having a bridge wall 12 with a throat 14 therein. The bridge wall 12 divides the tank into a combination melting and fining zone 16 and into a working zone 18. A plurality of glass take-off troughs 20, 22 and 24 are provided connecting to the working zone through a series of outlets 26, 28 and 30. Each take-off trough has an outlet aperture 32, 34 and 36 therein through which the glass flows in a filament 38 as may be seen in Figure 2. Beneath the apertures 32, 34 and 36 are provided pairs of shears 40, 42 and 44 of a conventional design which are effective to clip or cut the filament 38 into discrete glass masses 46 of any desired size. As a matter of convenience and safety the shears 40, 42 and 44 are grounded. Where the shears are not grounded they may be at a dangerously high potential and constitute a hazard to operating personnel.

The tank 10 is provided with any arrangement of Joule effect electrodes such as for instance the three horizontal electrodes 48, 50 and 52 shown in Figure 1. According to my invention there is also provided in the working zone 18 of the tank 10 an auxiliary electrode 54 which is connected to ground.

In the ordinary operation of the furnace of Figure 1 without the use of my auxiliary grounded electrode, the end wall electrode 50 is partially grounded through the phenomenon previously described and this causes stray currents to flow from the electrodes 48 and 52 through the throat 14 into the troughs 20, 22 and 24 and through the outlet apertures 32, 34 and 36 to the shears 40, 42 and 44 thereby rapidly deteriorating the shears and rendering inaccurate the readings of thermocouples. When an auxiliary grounded electrode such as electrode 54 is provided in the working zone 18 the shortest path of current flow between the electrodes 48 and 52 is through the throat 14 to such grounded electrode 54 and this eliminates substantially all of the current flow to the shears 40, 42 and 44 and prevents their accelerated deterioration.

While the auxiliary grounded electrode has been shown in the furnace of Figure 1 as being in the working zone I may also provide such electrode in the fining zone as shown in Figure 3. In that figure there is shown a glass furnace 56 having a combination melting and fining zone 58 and working zone 60 separated from the zone 58 by means of the bridge wall 62 having throat 64 therein. A plurality of Joule effect electrodes 66, 68 and 70 enter the side walls of the furnace. In order to prevent the flow of stray Joule effect currents through the throat 64 and through the aperture or apertures to the shears there is provided an auxiliary grounded electrode 72 near the bridge wall 62. The placement of the electrode 72 in the fining zone may be varied so long as it is nearer to the throat than the nearest electrode. When the auxiliary ground electrode is placed in the working zone it must be closer to the Joule effect electrode than any shears.

While it is possible to utilize a single grounded auxiliary electrode in the fining zone as shown in Figure 3, it is preferable to utilize two such electrodes as are shown in Figure 4. Thus in Figure 4 there is shown a glass tank 74 having a combination melting and fining zone 76 separated from a working zone 78 by means of a bridge wall 80 having a submerged throat 82. A plurality of Joule effect electrodes 84, 86 and 88 are provided in the zone 76 and a pair of auxiliary grounded electrodes 90 and 92 are provided next to the bridge wall 80. While a pair of such grounded electrodes is preferably utilized where they are placed in the fining zone, it is only necessary to utilize one such electrode in the working zone.

While the auxiliary grounded electrodes shown in the drawings of this application have been horizontal electrodes it is to be understood that they may be of any type. That is to say, the grounded auxiliary electrodes may be horizontal or vertical, may enter the tank at any angle and at any level, so long as they are within the molten mass of glass. Specific arrangements of tanks, electrodes and draw-off troughs and shears have been shown, but it will be understood that this has been for the purpose of illustration only and is not to be deemed limiting in any sense.

I claim:

1. A glass furnace comprising in combination; a tank providing melting, fining, and working zones, outlet means in said working zone for withdrawing glass, a plurality of Joule effect electrodes in said melting and fining zone, and a grounded electrode in said tank spaced a shorter distance from any of said electrodes than said outlet means is spaced from the same electrode.

2. A glass furnace comprising in combination; a tank providing a melting, fining, and working zones, outlet means in said working zone for withdrawing glass, shear means associated with said outlet means, a plurality of Joule effect electrodes in said melting and fining zone, and a grounded electrode in said tank spaced a shorter distance from any of said electrodes than said shear means is spaced from the same electrode.

3. A glass furnace comprising in combination; a tank providing a melting and fining zone separated from a working zone by means of a wall having a throat therein, a plurality of Joule effect electrodes in said melting and fining zone, and a grounded electrode in said melting and fining zone, said grounded electrode being spaced a shorter distance from said throat than any Joule effect electrode is spaced from said throat.

4. A glass furnace comprising in combination; a tank providing a combination melting and fining zone separated from a working zone by means of a wall having a throat therein, a plurality of Joule effect electrodes in said melting and fining zone, and a pair of grounded electrodes in said melting and fining zone, each of said grounded electrodes being spaced a shorter distance from said throat than any Joule effect electrode is spaced from said throat.

5. A glass furnace comprising in combination; a tank providing a combination melting and fining zone separated from a working zone by means of a wall having a throat therein, a plurality of Joule effect electrodes in said melting and fining zone, and a grounded electrode in said working zone.

6. A method of manufacturing glass comprising the steps of; applying heat to a glass mass by means of Joule effect electrodes, withdrawing molten glass from said mass, and flowing an electrical current through said glass mass from at least one of said Joule effect electrodes to a grounded electrode to substantially prevent the flow of electrical currents through the glass undergoing withdrawal.

7. A method of manufacturing glass in a furnace having a combined melting and fining zone and a working zone, comprising the steps of; applying heat to a glass mass in said melting and fining zone by means of Joule effect electrodes, and flowing an electrical current through said glass mass in said melting and fining zone from at least one of said Joule effect electrodes to a grounded electrode in said melting and fining zone to substantially prevent the flow of electrical current out of said melting and fining zone into said working zone.

8. A method of manufacturing glass in a furnace having a melting and fining zone and a working zone, comprising the steps of; applying heat to a glass mass in said melting and fining zone by means of Joule effect electrodes, and flowing an electrical current through said glass mass in said melting and fining zone from at least one of said Joule effect electrodes to a grounded electrode in said working zone to substantially prevent the flow of electrical current beyond said grounded electrode.

9. A method of manufacturing glass in a furnace having a combined melting and fining zone and a working zone, comprising the steps of; applying heat to a glass mass in said melting and fining zone by means of Joule effect electrodes, withdrawing glass from said working zone, and flowing an electrical current through said glass mass in said melting and fining zone from at least one of said Joule effect electrodes to a grounded electrode in said furnace to prevent the flow of electrical current through said glass being withdrawn.

10. A method as set out in claim 9 wherein said grounded electrode is in said melting and fining zone.

11. A method as set out in claim 9 wherein said grounded electrode is in said working zone.

References Cited in the file of this patent

UNITED STATES PATENTS

| | | |
|---|---|---|
| 2,545,619 | Lambert | Mar. 20, 1951 |
| 2,636,913 | Lambert | Apr. 28, 1953 |

FOREIGN PATENTS

| | | |
|---|---|---|
| 597,842 | Great Britain | Feb. 4, 1948 |